United States Patent
Lin et al.

(10) Patent No.: US 10,009,872 B2
(45) Date of Patent: Jun. 26, 2018

(54) MOBILE DEVICE, OPERATING METHOD THEREOF, AND NON-TRANSITORY COMPUTER READABLE STORAGE MEDIUM FOR CONTROLLING AN EXTERNAL DEVICE

(71) Applicant: INSTITUTE FOR INFORMATION INDUSTRY, Taipei (TW)

(72) Inventors: Cheng-Yang Lin, Taipei (TW); Jing-Ming Chiu, Taipei (TW); Hsiao-Chen Chang, Taipei (TW); Chien-Chung Chiu, Yilan County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days. days.

(21) Appl. No.: 15/368,697

(22) Filed: Dec. 5, 2016

(65) Prior Publication Data
US 2018/0152912 A1  May 31, 2018

(30) Foreign Application Priority Data
Nov. 28, 2016 (TW) .............................. 105139101 A (51) Int. Cl.
*H04W 24/00* (2009.01)
*H04W 64/00* (2009.01)
(Continued)

(52) U.S. Cl.
CPC ........ *H04W 64/006* (2013.01); *H04B 17/318* (2015.01); *H04W 4/023* (2013.01);
(Continued)

(58) Field of Classification Search
None
See application file for complete search history.

(56) References Cited

U.S. PATENT DOCUMENTS

| | | | | |
|---|---|---|---|---|
| 2014/0120958 A1* | 5/2014 | Nitta | ..................... | H04W 64/00 455/457 |
| 2015/0039415 A1* | 2/2015 | Boldyrev | ........... | G06Q 30/0242 705/14.41 |
| 2015/0316579 A1* | 11/2015 | Pakzad | ................... | G01P 15/02 702/150 |

FOREIGN PATENT DOCUMENTS

CN  103884337 A  6/2014

OTHER PUBLICATIONS

The office action of the corresponding Taiwanese application dated Jul. 19, 2017.

* cited by examiner

*Primary Examiner* — Idowu O Osifade
(74) *Attorney, Agent, or Firm* — CKC & Partners Co., Ltd.

(57) ABSTRACT

An operating method of a mobile device includes determining a plurality of moving directions of a mobile device corresponding to a plurality of time points according to an acceleration sensing signal; determining a plurality of distances between the mobile device and an external wireless signal transmitter corresponding to the time points according to a wireless signal from the external wireless signal transmitter; calculating an average moving speed of the mobile device according to the moving directions and the distances between the mobile device and the external wireless signal transmitter; estimating an estimating moving direction of the mobile device according to the moving directions; and selectively outputting an operating requirement according to the average moving speed and the estimating moving direction of the mobile device, to make an external device operates an instruction corresponding to the operating requirement.

26 Claims, 5 Drawing Sheets

(51) Int. Cl.
*H04W 4/02* (2018.01)
*H04B 17/318* (2015.01)
*H04W 4/029* (2018.01)

(52) U.S. Cl.
CPC ........... *H04W 4/026* (2013.01); *H04W 4/027* (2013.01); *H04W 4/028* (2013.01); *H04W 4/029* (2018.02)

MOBILE DEVICE, OPERATING METHOD THEREOF, AND NON-TRANSITORY COMPUTER READABLE STORAGE MEDIUM FOR CONTROLLING AN EXTERNAL DEVICE

RELATED APPLICATIONS

This application claims priority to Taiwan Application Serial Number 105139101, filed Nov. 28, 2016, which is herein incorporated by reference.

BACKGROUND

Field of Invention

The present disclosure relates to an electronic device, an operating method, and a non-transitory computer readable medium. More particularly, a mobile device, an operating method for a mobile device, and a non-transitory computer readable medium.

Description of Related Art

With advances in technology, mobile devices are widely used in our daily lives.

In some environment, when a user approaches an external device (e.g., an external display, an external audio player, or any device for performing a certain operation), the external device may perform a certain operation (e.g., display an advertisement or play an audio) to provide an advertisement or certain information to the user. For example, in some application, the external device may perform the certain operation when the distance between the user and the external device is smaller than a distance threshold. However, due to system latency or errors of signals, the time of performing the certain operation may be delayed, and therefore causing a bad result of the certain operation.

Thus, a better way is desired.

SUMMARY

One aspect of the present disclosure is related to an operation method for a mobile device. In accordance with one embodiment of the present disclosure, the operating method includes determining a plurality of moving directions of a mobile device corresponding to a plurality of time points according to an acceleration sensing signal; determining a plurality of distances between the mobile device and an external wireless signal transmitter corresponding to the time points according to a wireless signal from the external wireless signal transmitter; calculating an average moving speed of the mobile device according to the moving directions and the distances between the mobile device and the external wireless signal transmitter; estimating an estimating moving direction of the mobile device according to the moving directions; and selectively outputting an operating requirement according to the average moving speed and the estimating moving direction of the mobile device, to make an external device operate an instruction corresponding to the operating requirement.

In accordance with one embodiment of the present disclosure, the operation of determining the moving directions of the mobile device corresponding to the time points includes acquiring a first included angle between a predetermined reference direction and a north direction; acquiring a plurality of second included angles between a plurality of acceleration directions corresponding to the time points and the north direction; and acquiring the moving directions of the mobile device corresponding to the time points according to a plurality of angle difference between the first included angle and the second included angles.

In accordance with one embodiment of the present disclosure, the operation of determining the distances between the mobile device and the external wireless signal transmitter corresponding to the time points includes determining the distances between the mobile device and the external wireless signal transmitter according to a plurality of signal strengths of the wireless signal corresponding to the time points.

In accordance with one embodiment of the present disclosure, the operation of calculating the average moving speed of the mobile device includes estimating a plurality of estimating locations of the mobile device corresponding to the time points according to the moving directions and the distances between the mobile device and the external wireless signal transmitter; and calculating the average moving speed of the mobile device according to the estimating locations of the mobile device corresponding to the time points.

In accordance with one embodiment of the present disclosure, the operation of outputting the operating requirement according to the average moving speed and the estimating moving direction of the mobile device includes estimating a present estimating location of the mobile device according to a present moving direction of the moving directions and a present distance of the distances; and determining whether to output the operating requirement according to the present estimating location, the average moving speed, and the estimating moving direction of the mobile device.

In accordance with one embodiment of the present disclosure, the operation of determining whether to output the operating requirement includes estimating whether an estimating distance between the mobile device and the external wireless signal transmitter is lower than a predetermined threshold within a predetermined period according to the present estimating location, the average moving speed, and the estimating moving direction of the mobile device; and outputting the operating requirement under a condition that the estimating distance between the mobile device and the external wireless signal transmitter is lower than the predetermined threshold within the predetermined period.

In accordance with one embodiment of the present disclosure, the operation method further includes storing each of the time points and the moving directions and the distances corresponding thereto into a storage component of the mobile device.

Another aspect of the present disclosure is related to a mobile device. In accordance with one embodiment of the present disclosure, the mobile device includes an acceleration sensor configured for providing an acceleration sensing signal; a wireless signal receiver configured for receiving a wireless signal from an external wireless signal transmitter; a wireless signal transmitter; and one or more processors electrically connected to the acceleration sensor, the wireless signal receiver, and the wireless signal transmitter. The one or more processor is configured for determining a plurality of moving directions of the mobile device corresponding to a plurality of time points according to the acceleration sensing signal; determining a plurality of distances between the mobile device and the external wireless signal transmitter corresponding to the time points according to the wireless signal; calculating an average moving speed of the mobile device according to the moving directions and the distances between the mobile device and the external wireless signal transmitter; estimating an estimating moving direction of the mobile device according to the moving directions; and selectively controlling the wireless signal transmitter for outputting an operating requirement according to the average moving speed and the estimating moving direction of the mobile device, to make an external device operate an instruction corresponding to the operating requirement.

In accordance with one embodiment of the present disclosure, the one or more processors is further configured for acquiring a first included angle between a predetermined reference direction and a north direction; acquiring a plurality of second included angles between a plurality of acceleration directions corresponding to the time points and the north direction; and acquiring the moving directions of the mobile device corresponding to the time points according to a plurality of angle difference between the first included angle and each of the second included angles.

In accordance with one embodiment of the present disclosure, the one or more processors is further configured for determining the distances between the mobile device and the external wireless signal transmitter according to a plurality of signal strengths of the wireless signal corresponding to the time points.

In accordance with one embodiment of the present disclosure, the one or more processors is further configured for estimating a plurality of estimating locations of the mobile device corresponding to the time points according to the moving directions and the distances between the mobile device and the external wireless signal transmitter; and calculating the average moving speed of the mobile device according to the estimating locations of the mobile device corresponding to the time points.

In accordance with one embodiment of the present disclosure, the one or more processors is further configured for estimating a present estimating location of the mobile device according to a present moving direction of the moving directions and a present distance of the distances; and determining whether to output the operating requirement according to the present estimating location, the average moving speed, and the estimating moving direction of the mobile device.

In accordance with one embodiment of the present disclosure, the one or more processors is further configured for estimating whether an estimating distance between the mobile device and the external wireless signal transmitter is lower than a predetermined threshold within a predetermined period according to the present estimating location, the average moving speed, and the estimating moving direction of the mobile device; and outputting the operating requirement under a condition that the estimating distance between the mobile device and the external wireless signal transmitter is lower than the predetermined threshold within the predetermined period.

In accordance with one embodiment of the present disclosure, the one or more processors is further configured for storing each of the time points and the moving directions and the distances corresponding thereto into a storage component of the mobile device.

Another aspect of the present disclosure is related to a non-transitory computer readable medium for storing a computer program configured to execute an operating method for a mobile device, the operating method. In accordance with one embodiment of the present disclosure, the operating method includes determining a plurality of moving directions of a mobile device corresponding to a plurality of time points according to an acceleration sensing signal; determining a plurality of distances between the mobile device and an external wireless signal transmitter corresponding to the time points according to a wireless signal from the external wireless signal transmitter; calculating an average moving speed of the mobile device according to the moving directions and the distances between the mobile device and the external wireless signal transmitter; estimating an estimating moving direction of the mobile device according to the moving directions; and selectively outputting an operating requirement according to the average moving speed and the estimating moving direction of the mobile device, to make an external device operate an instruction corresponding to the operating requirement.

In accordance with one embodiment of the present disclosure, the operation of determining the moving directions of the mobile device corresponding to the time points includes acquiring a first included angle between a predetermined reference direction and a north direction; acquiring a plurality of second included angles between a plurality of acceleration directions corresponding to the time points and the north direction; and acquiring the moving directions of the mobile device corresponding to the time points according to a plurality of angle difference between the first included angle and the second included angles.

In accordance with one embodiment of the present disclosure, the operation of determining the distances between the mobile device and the external wireless signal transmitter corresponding to the time points includes determining the distances between the mobile device and the external wireless signal transmitter according to a plurality of signal strengths of the wireless signal corresponding to the time points.

In accordance with one embodiment of the present disclosure, the operation of calculating the average moving speed of the mobile device includes estimating a plurality of estimating locations of the mobile device corresponding to the time points according to the moving directions and the distances between the mobile device and the external wireless signal transmitter; and calculating the average moving speed of the mobile device according to the estimating locations of the mobile device corresponding to the time points.

In accordance with one embodiment of the present disclosure, the operation of outputting the operating requirement according to the average moving speed and the estimating moving direction of the mobile device includes estimating a present estimating location of the mobile device according to a present moving direction of the moving directions and a present distance of the distances; and determining whether to output the operating requirement according to the present estimating location, the average moving speed, and the estimating moving direction of the mobile device.

In accordance with one embodiment of the present disclosure, the operation of determining whether to output the operating requirement includes estimating whether an estimating distance between the mobile device and the external wireless signal transmitter is lower than a predetermined threshold within a predetermined period according to the present estimating location, the average moving speed, and the estimating moving direction of the mobile device; and outputting the operating requirement under a condition that the estimating distance between the mobile device and the external wireless signal transmitter is lower than the predetermined threshold within the predetermined period.

Through utilizing one embodiment described above, the control of the operation of the external device can be more accurate.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a mobile device. To facilitate the description to follow, a tablet computer or a smart phone will be taken as examples in the following paragraphs. However, the present disclosure is not limited to this embodiment.

Figure 1:
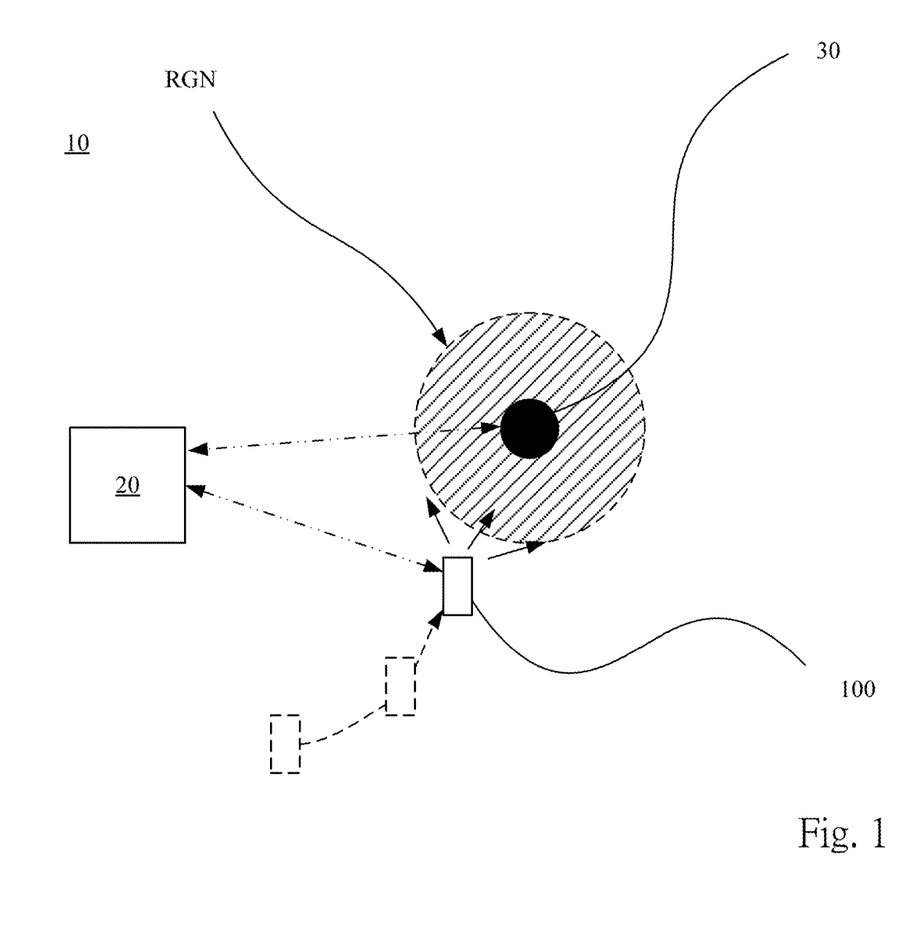
FIG. 1 illustrates a system according to one embodiment of the present disclosure.

Reference is made to FIG. 1, which is a schematic diagram of a system 10 according to one embodiment of the present disclosure. In one embodiment, the system 10 includes a mobile device 100, a server 20, and an external device 30. In this embodiment, the mobile device 100 can communicate with the server 20 and the external device 30 via a wireless network, and the server 20 can communicate with the external device 30 via a wire or wireless network.

In this embodiment, the external device 30 can be an external display, an external audio player, or any device for performing a certain operation. In one embodiment, the external device 30 may be configured for providing advertisement or certain information, but is not limited in this regard. Details of the external device 30 will be described in the paragraphs below.

In one embodiment, the mobile device 100 can estimate an estimating moving direction and an estimating moving speed at a next period according to the moving directions and moving speeds in the past. In one embodiment, the mobile device 100 can determine whether the mobile device 100 approaches the external device 30 (e.g., enters the region RGN (e.g., when the distance between the mobile device 100 and the external device 30 is lower than 5 meters, the mobile device 100 enters the region RGN. That is, the region RGN can be defined by the distance between the mobile device 100 and the external device 30)) in a next period according to the estimating moving direction and the estimating moving speed. If so, the mobile device 100 can ask the server 20 to control the external device 30 to perform a certain operation (e.g., to display an image, to play an audio, or to perform a certain action). It should be noted that, in different embodiments, the mobile device 100 can directly ask the external device 30 to perform the certain operation, and the server 20 can be adaptively omitted.

Figure 2:
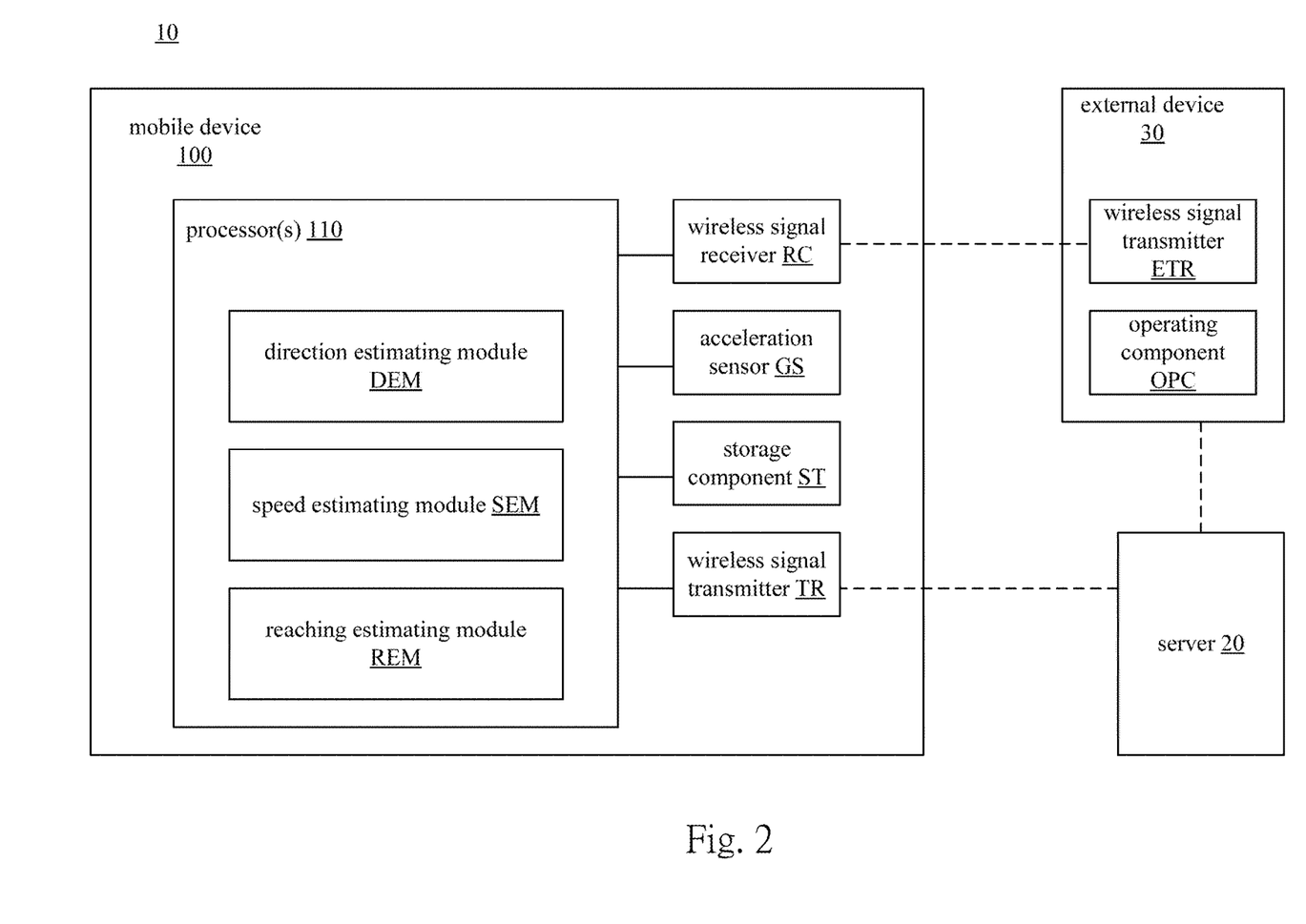
FIG. 2 is a schematic diagram of the system according to one embodiment of the present disclosure.

FIG. 2 is a schematic diagram of the system 10 according to one embodiment of the present disclosure. In this embodiment, the external device 30 may include an operating component OPC and a wireless signal transmitter ETR.

In this embodiment, the operating component OPC may include a display component, but is not limited in this regard. Another component (e.g., audio playing component) is within the contemplated scope of the present disclosure.

In this embodiment, the wireless signal transmitter ETR is configured to output a wireless signal ETRT. In one embodiment, the wireless signal transmitter ETR can be realized by using a Bluetooth Low Energy (BLE) signal transmitter, and the wireless signal ETRT can be a BLE signal, but another realization is within the contemplated scope of the present disclosure. It should be noted that, in different embodiments, the wireless signal transmitter ETR can be disposed independent from the external device 30. For example, the wireless signal transmitter ETR can be disposed around the external device 30, but is not limited in this regard.

In one embodiment, the mobile device 100 can include one or more processors 110, a wireless signal receiver RC, a wireless signal transmitter TR, an acceleration sensor GS, and a storage component ST. In this embodiment, the one or more processors 110 are electrically connected to the wireless signal receiver RC, the wireless signal transmitter TR, the acceleration sensor GS, and the storage component ST. In one embodiment, the mobile device 100 can further include an electronic compass electrically connected to the one or more processors 110 configured to identify a north direction. Details of the electronic compass and the north direction will be described in the paragraphs below.

In this embodiment, the acceleration sensor GS can be realized by using, for example, a G-sensor, but is not limited in this regard. The wireless signal receiver RC can be realized by using, for example, a Bluetooth signal receiver, but is not limited in this regard. The wireless signal transmitter TR can be realized by using, for example, a BLE signal transmitter, a Wi-Fi signal transmitter, an LTE signal transmitter, or another suitable signal transmitter for a wireless network, but is not limited in this regard.

In this embodiment, the one or more processors 110 can be realized by, for example, one or more central processing unit (CPU), one or more microprocessor, or another suitable calculating device(s), but is not limited in this regard. The storage component ST can be realized by, for example, a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In this embodiment, the acceleration sensor GS is configured for providing an acceleration sensing signal GST, in which the acceleration sensing signal GST corresponds to an acceleration direction of the mobile device 100. The wireless signal receiver RC is configured to receive the wireless signal ETRT from the external wireless signal transmitter ETR.

In this embodiment, the one or more processors 110 are configured to determine a plurality of moving directions of the mobile device 100 corresponding to a plurality of time points according to the acceleration sensing signal GST. Additionally, the one or more processors 110 are configured to determine a plurality of distances between the mobile device 100 and the external wireless signal transmitter ETR corresponding to the time points according to the wireless signal ETRT. Additionally, the one or more processors 110 are configured to calculate an average moving speed of the mobile device 100 according to the moving directions and the distances between the mobile device 100 and the external wireless signal transmitter ETR. This average moving speed can be taken as an estimating moving speed of the mobile device 100 in a next period. Additionally, the one or more processors 110 are configured to calculate an estimating moving direction in a next period of the mobile device 100 according to the moving directions.

Subsequently, the one or more processors 110 are configured to selectively control the wireless signal transmitter TR for outputting an operating requirement according to the average moving speed of the mobile device 100 and the estimating moving direction of the mobile device 100, to make the external device 30 operate an instruction corresponding to the operating requirement (e.g., display an image, play an audio, or perform a certain action). For example, the external device 30 can display an image, play an audio, perform a certain action corresponding to the operating requirement through a display component, an audio player, or a certain operating component.

Through the operations described above, the external device 30 can be controlled to operate according to the moving directions and moving speeds in the past, so as to make the operation of the external device 30 more accurate.

In some embodiments, the one or more processors 110 may further include a direction estimating module DEM, a speed estimating module SEM, and a reaching estimating module REM. In one embodiment, functions of the direction estimating module DEM, the speed estimating module SEM, and the reaching estimating module REM can be realized by using the one or more processors 110 to execute computer program stored in the storage component ST.

In one embodiment, the direction estimating module DEM is configured to determine the moving directions of the mobile device 100 corresponding to the time points according to the acceleration sensing signal GST, and calculate an estimating moving direction in a next period of the mobile device 100 according to the moving directions.

In one embodiment, the speed estimating module SEM is configured to determine the distances between the mobile device 100 and the external wireless signal transmitter ETR corresponding to the time points according to the wireless signal ETRT, and calculate the average moving speed of the mobile device 100 according to the moving directions and the distances between the mobile device 100 and the external wireless signal transmitter ETR.

In one embodiment, the reaching estimating module REM is configured to selectively control the wireless signal transmitter TR for outputting an operating requirement according to the average moving speed of the mobile device 100 and the estimating moving direction of the mobile device 100, to make the external device 30 operate an instruction corresponding to the operating requirement (e.g., display an image, play an audio, or perform a certain action).

Figure 3:
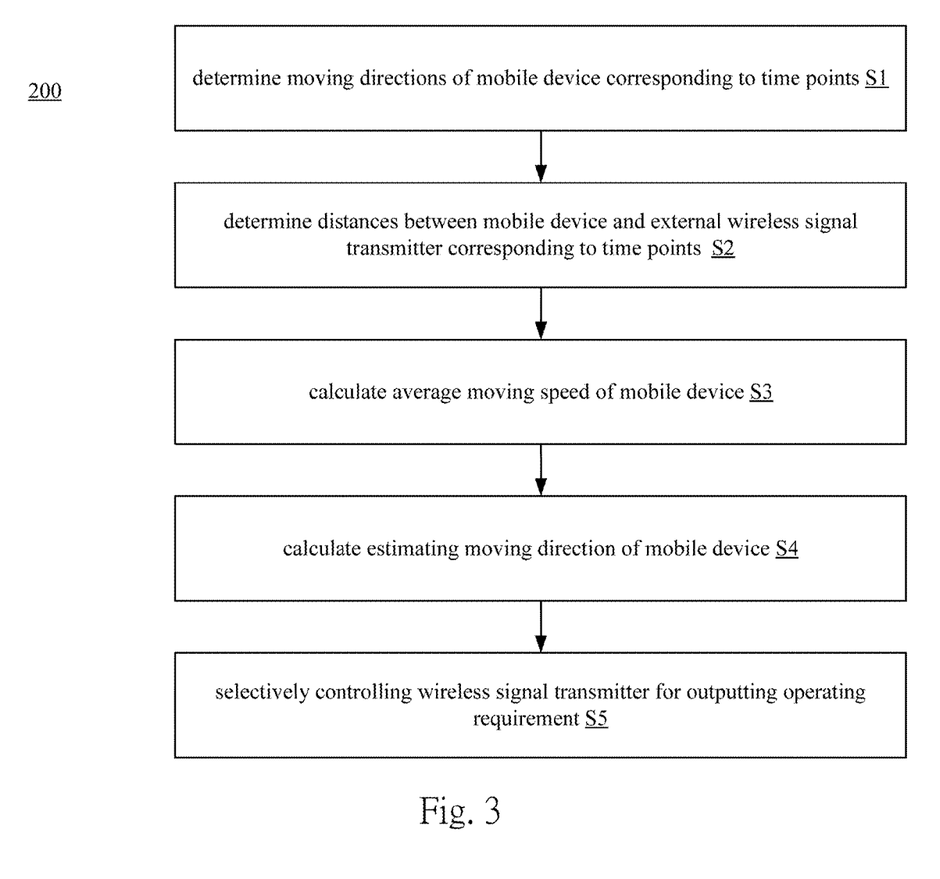
FIG. 3 is a flowchart of an operating method of a mobile device according to one embodiment of the present disclosure.

In the following paragraphs, details of the present disclosure are provided with reference to an operating method 200 for a mobile device shown in FIG. 3. However, the present disclosure is not limited to the embodiment below.

It should be noted that, the operating method 200 can be applied to a mobile device having a structure that is the same as or similar to the structure shown in FIG. 2. To simplify the description below, in the following paragraphs, the embodiment shown in FIG. 2 will be used as an example to describe the operating method 200 according to an embodiment of the present disclosure. However, the present disclosure is not limited to application to the embodiment shown in FIG. 2.

Additionally, the operating method 200 can be implemented as a computer program stored in one or more non-transitory computer readable medium to be read for controlling a computer, an electronic device, or the one or more processors 110 to execute the operating method 200. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In addition, it should be noted that, in the steps of the following operating method 200, no particular sequence is required unless otherwise specified. Moreover, the following steps also may be performed simultaneously or the execution times thereof may at least partially overlap.

Furthermore, the steps of the following operating method 200 may be added, replaced, and/or eliminated as appropriate, in accordance with various embodiments of the present disclosure.

In this embodiment, the operating method 200 includes the operations below.

In operation S1, the one or more processors 110 determine a plurality of moving directions of the mobile device 100 corresponding to a plurality of time points according to the acceleration sensing signal GST.

In one embodiment, the one or more processors 110 may further use an angular speed sensor (e.g., a gyroscope) (not shown) to sense the rotations of the mobile device 100, and accordingly increase the accuracy of the moving directions.

In one embodiment, the time intervals between the time points can be identical to each other (e.g., 3 seconds), or partially or totally different from each other.

In operation S2, the one or more processors 110 determine a plurality of distances between the mobile device 100 and the external wireless signal transmitter ETR corresponding to the time points according to the wireless signal ETRT.

In one embodiment, the one or more processors 110 determine the distances between the mobile device 100 and the external wireless signal transmitter ETR according to a plurality of signal strengths of the wireless signal ETRT corresponding to the time points.

In operation S3, the one or more processors 110 calculate an average moving speed of the mobile device 100 according to the moving directions and the distances between the mobile device 100 and the external wireless signal transmitter ETR. In one embodiment, this average moving speed can be taken as an estimating moving speed of the mobile device 100 in a next period.

In one embodiment, the one or more processors 110 estimate a plurality of estimating locations of the mobile device 100 corresponding to the time points according to the moving directions and the distances between the mobile device 100 and the external wireless signal transmitter ETR. For example, the one or more processors 110 may take the moving directions as angular coordinates in polar coordinates, and take the distances as radial coordinates in polar coordinates, to acquire the estimating locations of the mobile device 100.

Subsequently, the one or more processors 110 calculate the average moving speed of the mobile device 100 according to the estimating locations of the mobile device 100 corresponding to the time points. For example, the one or more processors 110 may acquire the time differences between the time points, and acquire a plurality of displacements of the mobile device 100 corresponding to the time differences between the time points according to the estimating locations of the mobile device 100 corresponding to the time points. Subsequently, the one or more processors 110 can calculate the average moving speed of the mobile device 100 according to the displacements and the time differences of the time points.

In operation S4, the one or more processors 110 calculate an estimating moving direction of the mobile device 100 according to the moving directions. In one embodiment, the one or more processors 110 may calculate an average of the moving directions to serve as the estimating moving direction of the mobile device 100.

In operation S5, the one or more processors 110 selectively controlling the wireless signal transmitter TR for outputting an operating requirement according to the average moving speed and the estimating moving direction of the mobile device 100, to make the external device 30 operate an instruction (e.g., display an image, play an audio, or perform a certain action) corresponding to the operating requirement.

In one embodiment, this operating requirement is provided to the server 20, to ask the server 20 to control the external device 30 perform a certain operation (e.g., to display an image, to play an audio, or to perform a certain action). It should be noted that, in different embodiments, this operating requirement can be directly provided to the external device 30, to ask the external device 30 to perform the certain operation, and in such embodiments, the server 20 may be adaptively omitted.

In one embodiment, the one or more processors 110 may estimate a present estimating location of the mobile device 100 according to a present moving direction of the moving directions and a present distance of the distances between the mobile device 100 and the wireless signal transmitter ETR. Subsequently, the one or more processors 110 may determine whether to output the operating requirement according to the present estimating location, the average moving speed, and the estimating moving direction of the mobile device 100.

In one embodiment, the one or more processors 110 may estimate whether an estimating distance between the mobile device 100 and the external wireless signal transmitter ETR is lower than a predetermined threshold (e.g., 5 meters) within a predetermined period (e.g., 3 seconds) according to the present estimating location, the average moving speed, and the estimating moving direction of the mobile device 100. Under a condition that within the predetermined period the external wireless signal transmitter ETR is lower than the predetermined threshold, the one or more processors 110 output the operating requirement. Under a condition that within the predetermined period the external wireless signal transmitter ETR is not lower than the predetermined threshold, the one or more processors 110 do not output the operating requirement.

Through the operations described above, the external device 30 can be controlled to operate according to the moving directions and moving speeds in the past, so as to make the operation of the external device 30 more accurate.

In one embodiment of the present disclosure, in operation S1, the operation that the one or more processors 110 determine the moving directions of the mobile device 100 corresponding to the time points includes the operations below.

Figure 4:
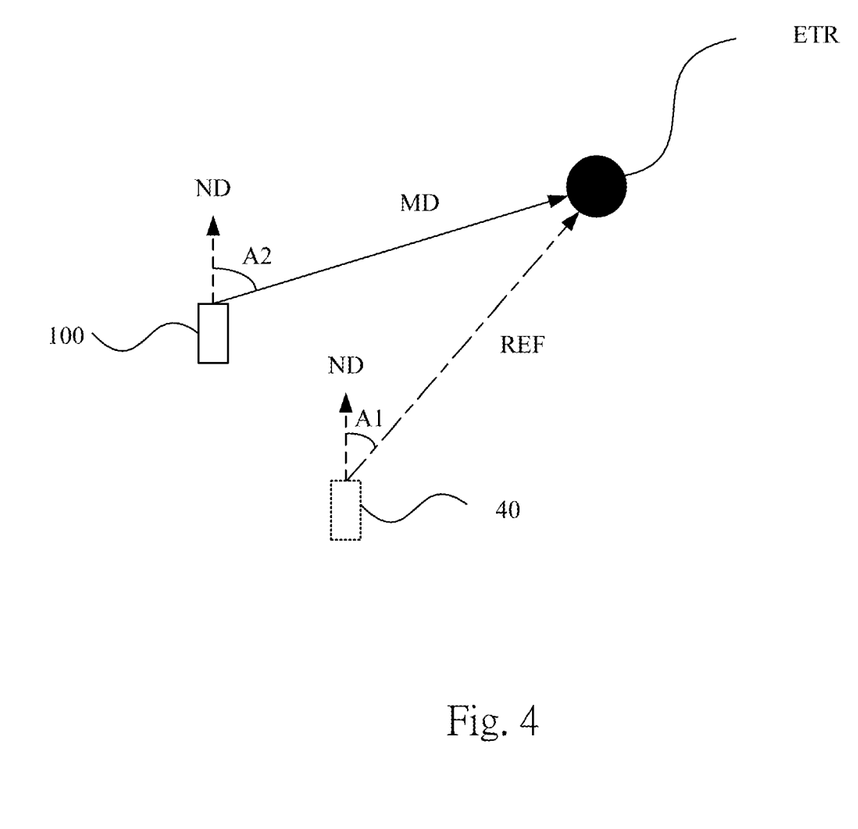
FIG. 4 illustrates an illustrative diagram of an operation of an operating method according to one embodiment of the present disclosure.

Reference is made to FIG. 4. In this embodiment, a database (not shown) may be used to store information corresponding to a predetermined reference direction REF, and/or information corresponding to a first included angle A1 (e.g., 45 degrees) between the predetermined reference direction REF and the north direction ND. In one embodiment, the predetermined reference direction REF indicates a moving direction of a reference device 40 (e.g., another mobile device) moving toward the external wireless signal transmitter ETR. In one embodiment, the database may be disposed on the server 20 or independent from the server 20. In one embodiment, the database may be disposed on the mobile device 100.

In one embodiment, at one of the time points, the one or more processors 110 can acquire a second included angle (e.g., 60 degrees) between the moving direction MD of the mobile device 100 corresponding to this time point and the north direction ND according to the acceleration sensing signal GST corresponding to this time point. The one or more processors 110 can acquire an angle difference (e.g., 15 degrees) between the moving direction MD of the mobile device 100 corresponding to this time point and the predetermined reference direction REF according to an angle difference (e.g., 15 degrees) between the first included angle A1 and the second included angle A2, and accordingly acquire the moving direction MD of the mobile device 100 corresponding to this time point.

In one embodiment, the mobile device 100 uses an electronic compass to identify the north direction ND, and accordingly acquire the second included angle A2 between the moving direction MD and the north direction ND. However, another method for identifying the north direction ND is within the contemplated scope of the present disclosure.

In one embodiment of the present disclosure, in each of the time points, the one or more processors 110 calculate an average moving speed and an estimating moving direction corresponding to a corresponding one of the time points, and determine whether to output the operating requirement according to the average moving speed and the estimating moving direction corresponding to the corresponding one of the time points and an estimating location of the mobile device 100 corresponding to the corresponding one of the time points.

In one embodiment of the present disclosure, in each of the time points, the one or more processors 110 can store information of a corresponding one of the time points, the moving direction of the mobile device 100 corresponding to the corresponding one of the time points, and the distance between the mobile device 100 and the external wireless signal transmitter ETR corresponding to the corresponding one of the time points into the storage component ST, so as to calculate the average moving speed and the estimating moving direction. That is, in one embodiment, the one or more processors 110 can store each of the time points and the moving directions and the distances between the mobile device 100 and the external wireless signal transmitter ETR corresponding to the time points into the storage component ST of the mobile device 100.

Figure 5:
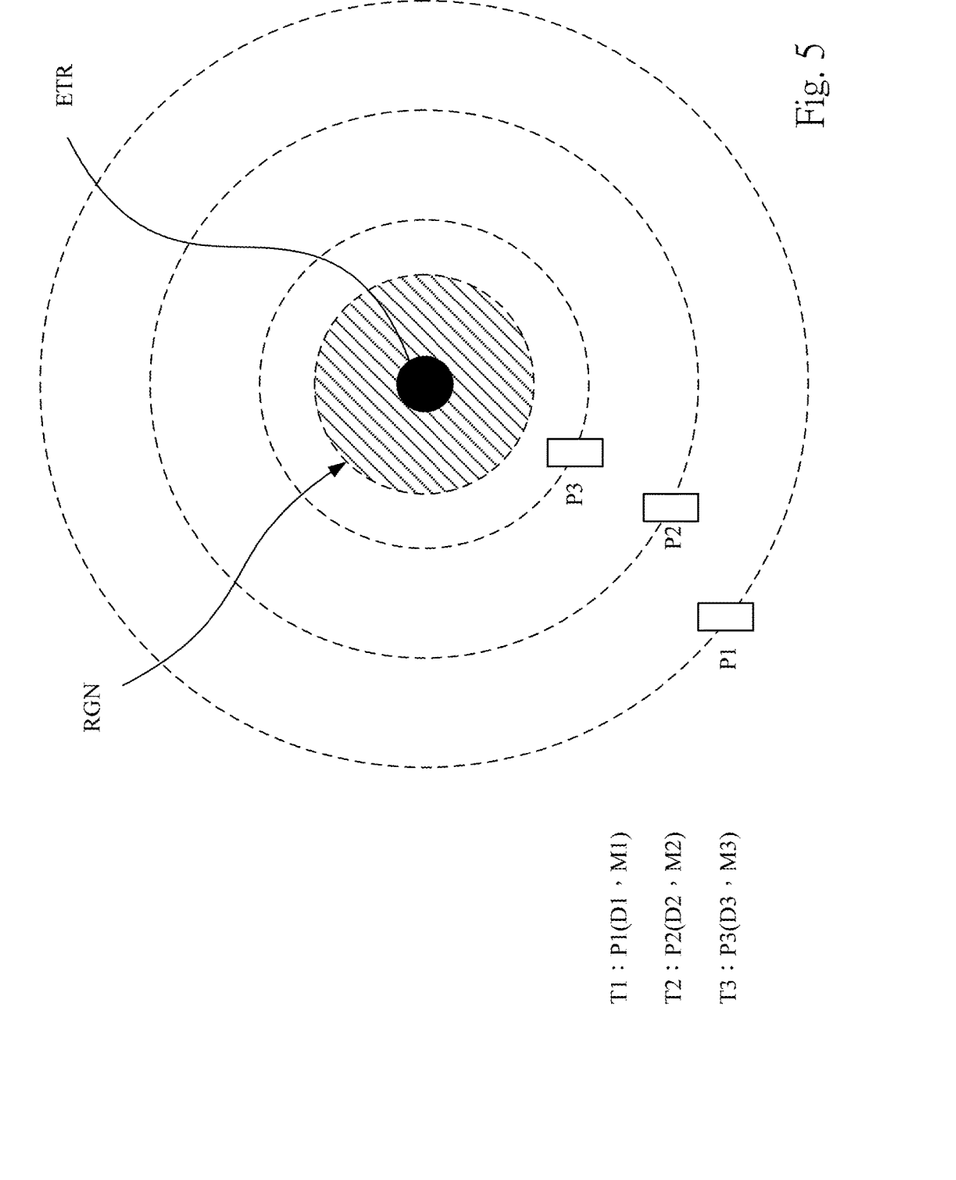
FIG. 5 illustrates an illustrative example of an operating method according to one embodiment of the present disclosure.

To facilitate the description to follow, an operative example is described below with reference to FIG. 5, but the present disclosure is not limited by the operative example below.

In this operative example, at time point T1 (e.g., $0^{th}$ second), the distance between the mobile device 100 and the wireless signal transmitter ETR is presented as a distance D1, and the moving direction of the mobile device 100 is presented as a direction M1. The one or more processors 110 estimate the estimating location P1 of the mobile device 100 according to the distance D1 and the direction M1.

Subsequently, at time point T2 (e.g., $3^{rd}$ second), the distance between the mobile device 100 and the wireless signal transmitter ETR is presented as a distance D2, and the moving direction of the mobile device 100 is presented as a direction M2. The one or more processors 110 estimate the estimating location P2 of the mobile device 100 according to the distance D2 and the direction M2.

The one or more processors 110 divide a displacement between the estimating locations P1, P2 by a time difference between the time points T1, T2 to acquire the average speed AVVT2 of the mobile device 100. In addition, the one or more processors 110 take a value equal to (direction M1+direction M2)/2 to serve as the average moving direction AVMT2 of the mobile device 100.

At this time, the one or more processors 110 determine an estimating distance between the mobile device 100 and the external wireless signal transmitter ETR will not lower than a predetermined threshold (e.g., 5 meters) within a predetermined period (e.g., 3 seconds) according to the estimating location P2, the average speed AVVT2 and the average moving direction AVMT2. That is, the one or more processors 110 determine the mobile device 100 will not enter the region RGN within the predetermined period. Thus, the one or more processors 110 do not output operating requirement.

Subsequently, at time point T3 (e.g., $6^{th}$ second), the distance between the mobile device 100 and the wireless signal transmitter ETR is presented as a distance D3, and the moving direction of the mobile device 100 is presented as a direction M3. The one or more processors 110 estimate the estimating location P3 of the mobile device 100 according to the distance D3 and the direction M3.

The one or more processors 110 divide a summation of the displacement between the estimating locations P1, P2 and a displacement between the estimating locations P2, P3 by a time difference between the time points T1, T3 to acquire the average speed AVVT3 of the mobile device 100. In addition, the one or more processors 110 take a value equal to (direction M1+direction M2+direction M3)/3 to serve as the average moving direction AVMT3 of the mobile device 100.

At this time, the one or more processors 110 determine an estimating distance between the mobile device 100 and the external wireless signal transmitter ETR will lower than the predetermined threshold (e.g., 5 meters) within the predetermined period (e.g., 3 seconds) according to the estimating location P3, the average speed AVVT3 and the average moving direction AVMT3. That is, the one or more processors 110 determine the mobile device 100 will enter the region RGN within the predetermined period. Thus, the one or more processors 110 do output operating requirement.

Additionally, in some embodiments, an excluded region can be preset corresponding to a disposition direction of the external device 30 (e.g., a display direction of the external device 30). When the one or more processors 110 determine that the mobile device 100 will merely enter the preset excluded region within the predetermined period (e.g., 3 seconds), the one or more processors 110 do not output operating requirement.

Through the operations described above, the external device 30 can be controlled to operate according to the moving directions and moving speeds in the past, so as to make the operation of the external device 30 more accurate.

It should be noted that although only three time points are described in the operative example above, an embodiment with another number of time points is within the contemplated scope of the present disclosure.

Although the present disclosure has been described in considerable detail with reference to certain embodiments thereof, other embodiments are possible. Therefore, the scope of the appended claims should not be limited to the description of the embodiments contained herein.

What is claimed is:

1. An operation method of a mobile device for controlling an external device, comprising:

determining a plurality of moving directions of the mobile device corresponding to a plurality of time points according to an acceleration sensing signal sensed by the mobile device;

determining a plurality of distances between the mobile device and an external wireless signal transmitter disposed in the external device corresponding to the time points according to a wireless signal transmitted by the external wireless signal transmitter disposed in the external device;

calculating an average moving speed of the mobile device according to the moving directions and the distances between the mobile device and the external wireless signal transmitter disposed in the external device;
estimating an estimating moving direction of the mobile device according to the moving directions; and
selectively outputting an operating requirement by the mobile device to control the external device according to the average moving speed and the estimating moving direction of the mobile device,
wherein the operating requirement outputted from the mobile device controls the external device to perform an action corresponding to the operating requirement.

2. The operation method as claimed in claim 1, wherein the operation of determining the moving directions of the mobile device corresponding to the time points comprises:
acquiring a first included angle between a predetermined reference direction and a north direction;
acquiring a plurality of second included angles between a plurality of acceleration directions corresponding to the time points and the north direction; and
acquiring the moving directions of the mobile device corresponding to the time points according to a plurality of angle difference between the first included angle and the second included angles.

3. The operation method as claimed in claim 1, wherein the operation of determining the distances between the mobile device and the external wireless signal transmitter corresponding to the time points comprises:
determining the distances between the mobile device and the external wireless signal transmitter according to a plurality of signal strengths of the wireless signal corresponding to the time points.

4. The operation method as claimed in claim 1, wherein the operation of calculating the average moving speed of the mobile device comprises:
estimating a plurality of estimating locations of the mobile device corresponding to the time points according to the moving directions and the distances between the mobile device and the external wireless signal transmitter; and
calculating the average moving speed of the mobile device according to the estimating locations of the mobile device corresponding to the time points.

5. The operation method as claimed in claim 1, wherein the operation of outputting the operating requirement according to the average moving speed and the estimating moving direction of the mobile device comprises:
estimating a present estimating location of the mobile device according to a present moving direction of the moving directions and a present distance of the distances; and
determining whether to output the operating requirement according to the present estimating location, the average moving speed, and the estimating moving direction of the mobile device.

6. The operation method as claimed in claim 5, wherein the operation of determining whether to output the operating requirement comprises:
estimating whether an estimating distance between the mobile device and the external wireless signal transmitter is lower than a predetermined threshold within a predetermined period according to the present estimating location, the average moving speed, and the estimating moving direction of the mobile device; and
outputting the operating requirement under a condition that the estimating distance between the mobile device and the external wireless signal transmitter is lower than the predetermined threshold within the predetermined period.

7. The operation method as claimed in claim 1 further comprising:
storing each of the time points and the moving directions and the distances corresponding thereto into a storage component of the mobile device.

8. The operation method as claimed in claim 1, wherein the action is to display an advertisement or play an audio.

9. The operation method as claimed in claim 1, further comprising:
predicting a predicting moving direction and a predicting moving speed at a next period according to the moving directions and the average moving speeds;
determining whether a distance between the mobile device and the external device is lower than a predetermined distance in the next period according to the predicting moving direction and the predicting moving speed;
outputting the operating requirement by the mobile device to control the external device when the distance between the mobile device and the external device is lower than the predetermined distance.

10. A mobile device for controlling an external device, comprises:
an acceleration sensor configured for providing an acceleration sensing signal;
a wireless signal receiver configured for receiving a wireless signal transmitted by an external wireless signal transmitter disposed in the external device;
a wireless signal transmitter; and
one or more processors electrically connected to the acceleration sensor, the wireless signal receiver, and the wireless signal transmitter, the one or more processor configured for:
determining a plurality of moving directions of the mobile device corresponding to a plurality of time points according to the acceleration sensing signal;
determining a plurality of distances between the mobile device and the external wireless signal transmitter disposed in the external device corresponding to the time points according to the wireless signal transmitted by the external wireless signal transmitter disposed in the external device;
calculating an average moving speed of the mobile device according to the moving directions and the distances between the mobile device and the external wireless signal transmitter disposed in the external device;
estimating an estimating moving direction of the mobile device according to the moving directions; and
selectively controlling the wireless signal transmitter of the mobile device for outputting an operating requirement according to the average moving speed and the estimating moving direction of the mobile device to control the external device, wherein the operating requirement outputted from the mobile device controls the external device to perform an action corresponding to the operating requirement.

11. The mobile device as claimed in claim 10, wherein the one or more processors further configured for:
acquiring a first included angle between a predetermined reference direction and a north direction;

acquiring a plurality of second included angles between a plurality of acceleration directions corresponding to the time points and the north direction; and acquiring the moving directions of the mobile device corresponding to the time points according to a plurality of angle difference between the first included angle and each of the second included angles.

12. The mobile device as claimed in claim 10, wherein the one or more processors further configured for:

determining the distances between the mobile device and the external wireless signal transmitter according to a plurality of signal strengths of the wireless signal corresponding to the time points.

13. The mobile device as claimed in claim 10, wherein the one or more processors further configured for:

estimating a plurality of estimating locations of the mobile device corresponding to the time points according to the moving directions and the distances between the mobile device and the external wireless signal transmitter; and calculating the average moving speed of the mobile device according to the estimating locations of the mobile device corresponding to the time points.

14. The mobile device as claimed in claim 10, wherein the one or more processors further configured for:

estimating a present estimating location of the mobile device according to a present moving direction of the moving directions and a present distance of the distances; and determining whether to output the operating requirement according to the present estimating location, the average moving speed, and the estimating moving direction of the mobile device.

15. The mobile device as claimed in claim 14, wherein the one or more processors further configured for:

estimating whether an estimating distance between the mobile device and the external wireless signal transmitter is lower than a predetermined threshold within a predetermined period according to the present estimating location, the average moving speed, and the estimating moving direction of the mobile device; and outputting the operating requirement under a condition that the estimating distance between the mobile device and the external wireless signal transmitter is lower than the predetermined threshold within the predetermined period.

16. The mobile device as claimed in claim 10, wherein the one or more processors further configured for:

storing each of the time points and the moving directions and the distances corresponding thereto into a storage component of the mobile device.

17. The mobile device as claimed in claim 10, wherein the action is to display an advertisement or play an audio.

18. The mobile device as claimed in claim 10, further comprising:

predicting a predicting moving direction and a predicting moving speed at a next period according to the moving directions and the average moving speeds;

determining whether a distance between the mobile device and the external device is lower than a predetermined distance in the next period according to the predicting moving direction and the predicting moving speed;

outputting the operating requirement by the mobile device to control the external device when the distance between the mobile device and the external device is lower than the predetermined distance.

19. A non-transitory computer readable storage medium for storing a computer program configured to execute an operating method of a mobile device for controlling an external device, the operating method comprising:

determining a plurality of moving directions of the mobile device corresponding to a plurality of time points according to an acceleration sensing signal sensed by the mobile device;

determining a plurality of distances between the mobile device and an external wireless signal transmitter disposed in the external device corresponding to the time points according to a wireless signal from the external wireless signal transmitter disposed in the external device;

calculating an average moving speed of the mobile device according to the moving directions and the distances between the mobile device and the external wireless signal transmitter disposed in the external device;

estimating an estimating moving direction of the mobile device according to the moving directions; and selectively outputting an operating requirement by the mobile device according to the average moving speed and the estimating moving direction of the mobile device to control the external device, wherein the operating requirement outputted from the mobile device controls the external device to perform an action corresponding to the operating requirement.

20. A non-transitory computer readable storage medium as claimed in claim 19, wherein the operation of determining the moving directions of the mobile device corresponding to the time points comprises:

acquiring a first included angle between a predetermined reference direction and a north direction;

acquiring a plurality of second included angles between a plurality of acceleration directions corresponding to the time points and the north direction; and acquiring the moving directions of the mobile device corresponding to the time points according to a plurality of angle difference between the first included angle and the second included angles.

21. A non-transitory computer readable storage medium as claimed in claim 19, wherein the operation of determining the distances between the mobile device and the external wireless signal transmitter corresponding to the time points comprises:

determining the distances between the mobile device and the external wireless signal transmitter according to a plurality of signal strengths of the wireless signal corresponding to the time points.

22. A non-transitory computer readable storage medium as claimed in claim 19, wherein the operation of calculating the average moving speed of the mobile device comprises:

estimating a plurality of estimating locations of the mobile device corresponding to the time points according to the moving directions and the distances between the mobile device and the external wireless signal transmitter; and calculating the average moving speed of the mobile device according to the estimating locations of the mobile device corresponding to the time points.

23. A non-transitory computer readable storage medium as claimed in claim 19, wherein the operation of outputting the operating requirement according to the average moving speed and the estimating moving direction of the mobile device comprises:

estimating a present estimating location of the mobile device according to a present moving direction of the moving directions and a present distance of the distances; and determining whether to output the operating requirement according to the present estimating location, the average moving speed, and the estimating moving direction of the mobile device.

24. A non-transitory computer readable storage medium as claimed in claim 23, wherein the operation of determining whether to output the operating requirement comprises:

estimating whether an estimating distance between the mobile device and the external wireless signal transmitter is lower than a predetermined threshold within a predetermined period according to the present estimating location, the average moving speed, and the estimating moving direction of the mobile device; and outputting the operating requirement under a condition that the estimating distance between the mobile device and the external wireless signal transmitter is lower than the predetermined threshold within the predetermined period.

25. A non-transitory computer readable storage medium as claimed in claim 19, wherein the action is to display an advertisement or play an audio.

26. A non-transitory computer readable storage medium as claimed in claim 19, further comprising:

predicting a predicting moving direction and a predicting moving speed at a next period according to the moving directions and the average moving speeds;

determining whether a distance between the mobile device and the external device is lower than a predetermined distance in the next period according to the predicting moving direction and the predicting moving speed;

outputting the operating requirement by the mobile device to control the external device when the distance between the mobile device and the external device is lower than the predetermined distance.

\* \* \* \* \*